(12) United States Patent
Dande et al.

(10) Patent No.: US 11,643,918 B2
(45) Date of Patent: May 9, 2023

(54) REAL-TIME WELLBORE DRILLING WITH DATA QUALITY CONTROL

(71) Applicant: Landmark Graphics Corporation, Houston, TX (US)

(72) Inventors: Shashi Dande, Spring, TX (US); Srinath Madasu, Houston, TX (US); Keshava Prasad Rangarajan, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 423 days.

(21) Appl. No.: 16/883,328

(22) Filed: May 26, 2020

(65) Prior Publication Data

US 2021/0372259 A1    Dec. 2, 2021

(51) Int. Cl.
| | |
|---|---|
| E21B 44/00 | (2006.01) |
| E21B 44/02 | (2006.01) |
| E21B 45/00 | (2006.01) |
| E21B 47/12 | (2012.01) |
| G06N 20/00 | (2019.01) |
| G06N 3/088 | (2023.01) |

(52) U.S. Cl.
CPC .............. *E21B 44/00* (2013.01); *E21B 44/02* (2013.01); *E21B 45/00* (2013.01); *E21B 47/12* (2013.01); *G06N 3/088* (2013.01); *G06N 20/00* (2019.01); *E21B 2200/20* (2020.05); *E21B 2200/22* (2020.05)

(58) Field of Classification Search
CPC ...... E21B 44/00; E21B 2200/22; G06N 3/088
See application file for complete search history.

(56) References Cited

U.S. PATENT DOCUMENTS

| | | |
|---|---|---|
| 2017/0198553 A1 | 7/2017 | Dykstra et al. |
| 2018/0025269 A1 | 1/2018 | Dursun et al. |
| 2018/0171774 A1 | 6/2018 | Ringer et al. |

FOREIGN PATENT DOCUMENTS

| | | | | |
|---|---|---|---|---|
| WO | 2016160005 | 10/2016 | | |
| WO | WO-2019040091 A1 * | 2/2019 | ............. | E21B 44/00 |

(Continued)

OTHER PUBLICATIONS

Madasu et al., "A Simulated Annealing Accelerated Bayesian Optimization (SAABO) for Real-Time Deep Neural Network Model with Range Constraints", EEE International Symposium on Signal Processing and Information Technology (ISSPIT), IEEE, Dec. 6, 2020, pp. 626-631.

(Continued)

*Primary Examiner* — Tara Schimpf
(74) *Attorney, Agent, or Firm* — Kilpatrick Townsend & Stockton LLP (57) ABSTRACT

Aspects and features of a system for real-time drilling using automated data quality control can include a computing device, a drilling tool, sensors, and a message bus. The message bus can receive current data from a wellbore. The computing device can generate and use a feature-extraction model to provide revised data values that include those for missing data, statistical outliers, or both. The model can be used to produce controllable drilling parameters using highly accurate data to provide optimal control of the drilling tool. The real-time message bus can be used to apply the controllable drilling parameters to the drilling tool.

20 Claims, 12 Drawing Sheets

(56) References Cited

FOREIGN PATENT DOCUMENTS

| WO | 2019147297 A1 | 8/2019 | |
|---|---|---|---|
| WO | 2019216891 | 11/2019 | |
| WO | 2020032949 | 2/2020 | |
| WO | 2020046351 | 3/2020 | |
| WO | WO-2020097060 A2 * | 5/2020 | ............. E21B 43/26 |

OTHER PUBLICATIONS

Application No. PCT/US2020/034533, International Search Report and Written Opinion, dated Feb. 24, 2021, 9 pages.
GB Application No. GB2101353.7 , "Search Report", dated Nov. 16, 2021, 4 pages.
CA App. No. CA3,108,969, "Office Action", dated May 11, 2022, 6 pages.
NO. Application No. NO20210215, Office Action, dated Nov. 8, 2021, 4 pages.
Berkenkamp et al., "Bayesian Optimization with Safety Constraints: Safe and Automatic Parameter Tuning in Robotics", Robotics, Mar. 2, 2018, pp. 1-22.
Snoek et al., "Scalable Bayesian Optimization Using Deep Neural Networks", Harvard University, School of Engineering and Applied Sciences, Jul. 13, 2015, 13 pages.

\* cited by examiner

REAL-TIME WELLBORE DRILLING WITH DATA QUALITY CONTROL

TECHNICAL FIELD

The present disclosure relates generally to digital processing of data about a wellbore. More specifically, but not by way of limitation this disclosure relates to the processing of such data to improve its accuracy for use in controlling a drilling tool.

BACKGROUND

A well includes a wellbore drilled through a subterranean formation. The conditions inside the subterranean formation where the drill bit is passing when the wellbore is being drilled continuously change. For example, the formation through which a wellbore is drilled exerts a variable force on the drill bit. This variable force can be due to the rotary motion of the drill bit, the weight applied to the drill bit, and the friction characteristics of each stratum of the formation. A drill bit may pass through many different materials, rock, sand, shale, clay, etc., in the course of forming the wellbore. Data can be collected from the wellbore during the process and adjustments to various drilling parameters are sometimes made during the drilling process to account for observed changes in the data.

DETAILED DESCRIPTION

Certain aspects and features of the present disclosure relate to eliminating statistical outliers and missing values from wellbore data efficiently to improve the accuracy of parameters provided to control a drilling tool in real-time. Multiple data samples can be used as input to a machine-learning model to enable the machine-learning model to condition the wellbore data. A feature-extraction model can project missing data, statistical outliers, or both, and impute missing values. The machine-learning model can be trained using real-time data to condition the data. Optimization can be used to maximize accuracy and minimize the computational resources required.

Improving or correcting wellbore data to be used real-time drilling has often included an extensive review of the wellbore data by a drilling engineer or other professional to spot and eliminate statistical outliers or missing values caused by noise, signal dropouts, or other perturbations of a sensor's environment or its connections. Aspects and features disclosed herein can dynamically determine and execute an optimized process for imputing missing values and eliminating statistical outliers in a real-time data feed using machine learning. A drilling professional can optionally review the corrected data for still greater accuracy. Even if such input is used, the entire solution response time can be improved since only the machine-corrected data may need to be reviewed.

In some examples, a system includes a drilling tool, sensors, and a real-time message bus such as one that operates using the message queueing telemetry transport (MQTT) protocol. A computing device can receive current data from the sensors and train a machine-learning model. The computing device can generate and use a feature-extraction model to provide revised data values. The system can produce controllable drilling parameters using highly accurate data to provide more optimal control of the drilling tool. The real-time message bus can be used to apply the controllable drilling parameters to the drilling tool.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
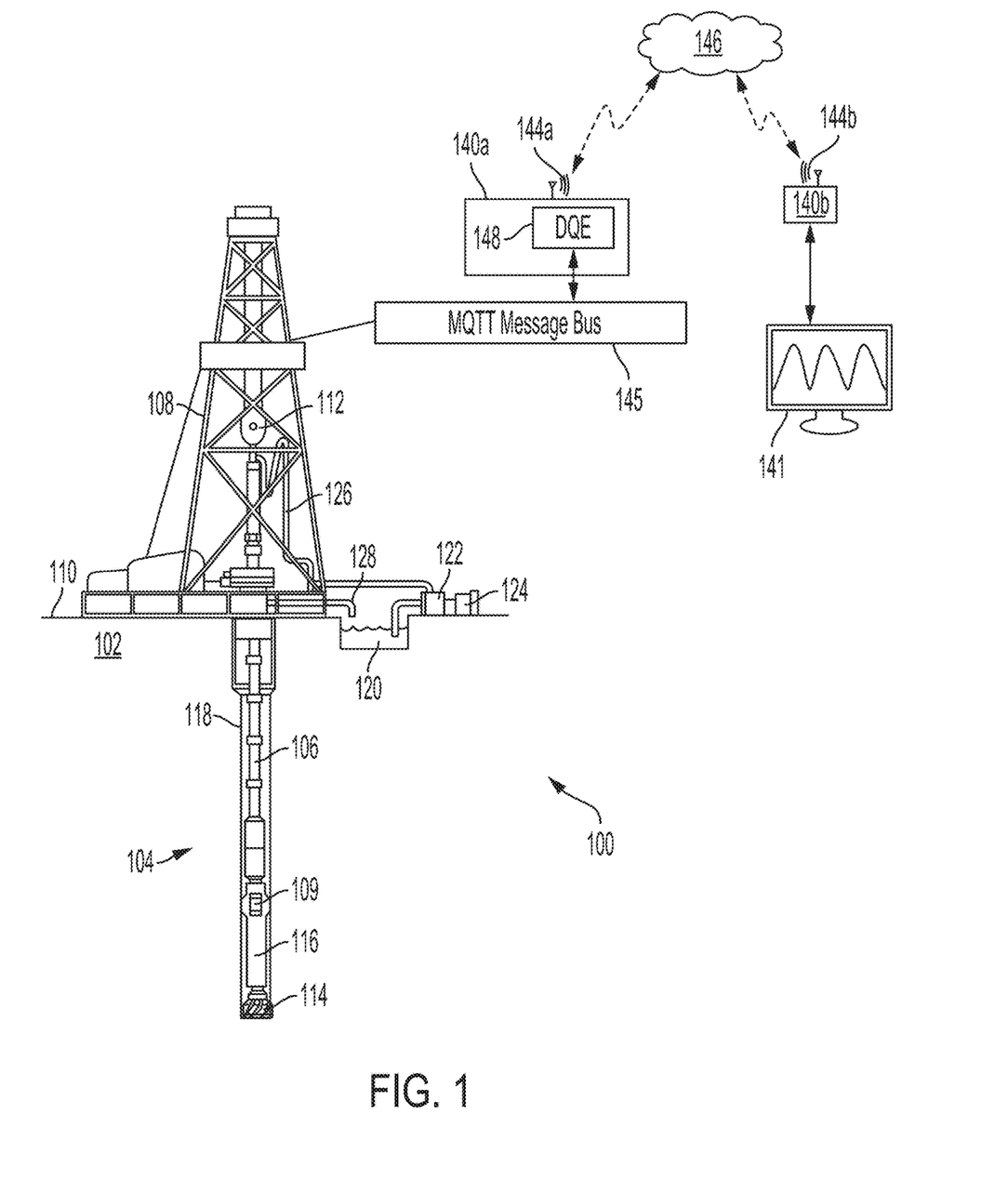
FIG. 1 is a cross-sectional view of an example of a drilling arrangement that includes a system for data quality improvement to provide accurate data for projecting parameters to control a drilling tool according to some aspects of the disclosure.

FIG. 1 is a cross-sectional view of an example of a drilling system 100 that may employ one or more principles of the present disclosure. A wellbore may be created by drilling into the earth 102 using the drilling system 100. The drilling system 100 may be configured to drive a bottom hole assembly (BHA) 104 positioned or otherwise arranged at the bottom of a drillstring 106 extended into the earth 102 from a derrick 108 arranged at the surface 110. The derrick 108 includes a kelly 112 used to lower and raise the drillstring 106. The BHA 104 may include a drill bit 114 operatively coupled to a drillstring 116, which includes a drilling tool and may be moved axially within a drilled wellbore 118 as attached to the drillstring 106. Drillstring 116 may include one or more sensors 109 to determine conditions of the drill bit and wellbore and return data values for various parameters to the surface through cabling (not shown) or by wireless signal. The combination of any support structure (in this example, derrick 108), any motors, electrical connections, and support for the drillstring may be referred to herein as a drilling arrangement.

During operation, the drill bit 114 penetrates the earth 102 and thereby creates the wellbore 118. The BHA 104 provides control of the drill bit 114 as it advances into the earth 102. Fluid or "mud" from a mud tank 120 may be pumped downhole using a mud pump 122 powered by an adjacent power source, such as a prime mover or motor 124. The mud may be pumped from the mud tank 120, through a stand pipe 126, which feeds the mud into the drillstring 106 and conveys the same to the drill bit 114. The mud exits one or more nozzles (not shown) arranged in the drill bit 114 and in the process cools the drill bit 114. After exiting the drill bit 114, the mud circulates back to the surface 110 via the annulus defined between the wellbore 118 and the drillstring 106, and in the process returns drill cuttings and debris to the surface. The cuttings and mud mixture are passed through a flow line 128 and are processed such that a cleaned mud is returned down hole through the stand pipe 126 once again.

The drilling arrangement of FIG. 1 and any sensors 109 (through the drilling arrangement or directly) are connected to a computing device 140a. In FIG. 1, the computing device 140a is illustrated as being stationary, however, a computing device to receive data from sensors 109 and control the drilling tool including drill bit 114 can be installed in a building such as a dog house, be hand-held, be located in a vehicle, or be remotely located. In some examples, the computing device 140a can process at least a portion of the data received and can transmit the processed or unprocessed data to another computing device 140b via a wired or wireless network 146. The other computing device 140b can be offsite, such as at a data-processing center or be located near computing device 140a. In this example, computing device 140b is connected to a console 141 for displaying data for a user such as a drill operator or drilling engineer and for receiving input from the user. Either or both computing devices can execute computer program code instructions that are executable by a processor to implement a data quality engine (DQE) 148. The computing devices 140a-b can include a processor interfaced with other hardware via a bus and a memory, which can include any suitable tangible (and non-transitory) computer-readable medium or memory device, such as RAM, ROM, EEPROM, or the like, can embody program components that configure operation of the computing devices 140a-b. In some aspects, the computing devices 140a-b can include input/output interface components (e.g., a display, printer, keyboard, touch-sensitive surface, and mouse) and additional storage.

The computing devices 140a-b can include communication devices 144a-b. The communication devices 144a-b can represent one or more of any components that facilitate a network connection. In the example shown in FIG. 1, the communication devices 144a-b are wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In some examples, the communication devices 144a-b can use acoustic waves, surface waves, vibrations, optical waves, or induction (e.g., magnetic induction) for engaging in wireless communications. In other examples, the communication devices 144a-b can be wired and can include interfaces such as Ethernet, USB, IEEE 1394, or a fiber optic interface. The computing devices 140a-b can receive wired or wireless communications from one another and perform one or more tasks based on the communications. These communications can include communications over a message queuing telemetry transport message bus 145, which may be implemented virtually over any kind of physical communication layer. The computing resources shown as examples herein can be scaled to multiple equipment arrangements. Transmission between computing devices can be supported through data replication.

Figure 2:
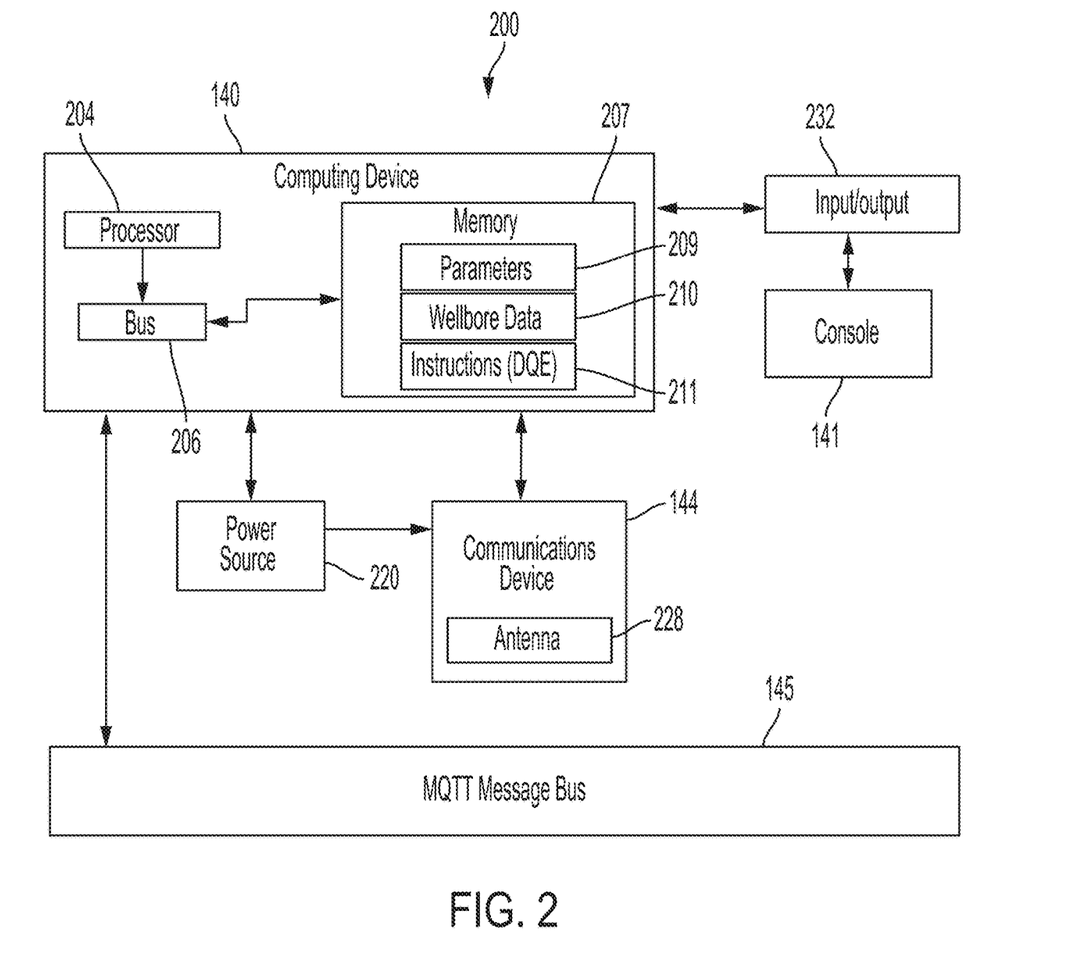
FIG. 2 is a block diagram of a system for data quality improvement according to some aspects of the disclosure.

FIG. 2 is a block diagram of an example of a system 200 for implementing data quality improvement according to some aspects of the disclosure. In some examples, the components shown in FIG. 2 (e.g., the computing device 140, power source 220, and communications device 144) can be integrated into a single structure. For example, the components can be within a single housing. MQTT message bus 145 can be included in the computing device as well, or alternatively can be separate. In other examples, most or all of the components shown in FIG. 2 can be distributed (e.g., in separate housings) and in electrical communication with each other.

The system 200 includes the computing device 140. The computing device 140 can include a processor 204, a memory 207, and an internal bus 206. The memory 207 can be used to store drilling parameters 209 and wellbore data 210. The processor 204 can execute one or more operations of computer program code instructions 211 for the DQE. The processor 204 can execute instructions 211 stored in the memory 207 to perform the operations. The processor 204 can include one processing device or multiple processing devices. Non-limiting examples of the processor 204 include a Field-Programmable Gate Array ("FPGA"), an application-specific integrated circuit ("ASIC"), a microprocessor, etc.

The processor 204 can be communicatively coupled to the memory 207 via the internal bus 206. The non-volatile memory 207 may include any type of memory device that retains stored information when powered off. Non-limiting examples of the memory 207 include electrically erasable and programmable read-only memory ("EEPROM"), flash memory, or any other type of non-volatile memory. In some examples, at least part of the memory 207 can include a medium from which the processor 204 can read instructions. A computer-readable medium can include electronic, optical, magnetic, or other storage devices capable of providing the processor 204 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The system 200 can include a power source 220. The power source 220 can be in electrical communication with the computing device 140 and the communications device 144. In some examples, the power source 220 can include a battery or an electrical cable (e.g., a wireline). In some examples, the power source 220 can include an AC signal generator. The computing device 140 can operate the power source 220 to apply a transmission signal to the antenna 228. For example, the computing device 140 can cause the power source 220 to apply a voltage with a frequency within a specific frequency range to the antenna 228. This can cause the antenna 228 to generate a wireless transmission. In other examples, the computing device 140, rather than the power source 220, can apply the transmission signal to the antenna 228 for generating the wireless transmission.

The system 200 can also include the communications device 144. The communications device 144 can include or can be coupled to the antenna 228. In some examples, part of the communications device 144 can be implemented in software. For example, the communications device 144 can include instructions stored in memory 207. The communications device 144 can receive signals from remote devices and transmit data to remote devices (e.g., the computing device 140b of FIG. 1). For example, the communications device 144 can transmit wireless communications that are modulated by data via the antenna 228. In some examples, the communications device 144 can receive signals (e.g., associated with data to be transmitted) from the processor 204 and amplify, filter, modulate, frequency shift, and otherwise manipulate the signals. In some examples, the communications device 144 can transmit the manipulated signals to the antenna 228. The antenna 228 can receive the manipulated signals and responsively generate wireless communications that carry the data.

The system 200 can receive input over MQTT message bus 145 from sensor(s) 109, shown in FIG. 1. System 200 in this example also includes input/output interface 232. Input/output interface 232 can connect to console 141 as well as other input/output devices. An operator may thus provide input using the input/output interface 232. An operator may also view a display of data or other information.

Figure 3:
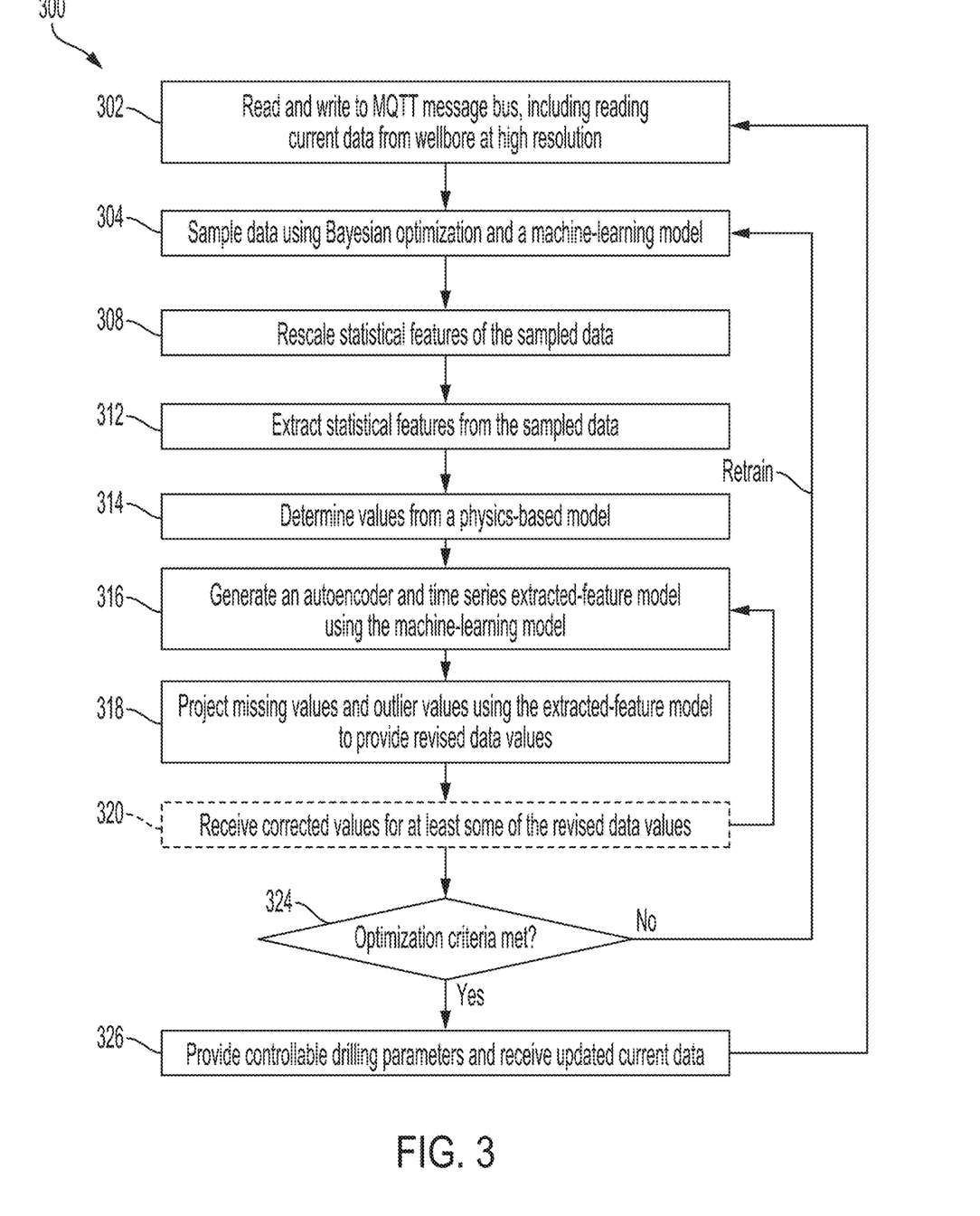
FIG. 3 is a flowchart illustrating an example of a process of using data quality improvement to provide values for controllable parameters for a drilling tool according to some aspects of the disclosure.

FIG. 3 is a flowchart illustrating an example of a process 300 for providing values for controllable parameters for drilling tool according to some aspects of the disclosure. At block 302, processor 204 reads and writes to the MQTT message bus 145 as needed to receive input and provide output. This data exchange includes reading current data from the wellbore at high resolution, for example, at a resolution of 50 values or more per second. At block 304, processor 204 samples the data using Bayesian optimization and a machine-learning model to normalize the data. The machine-learning model can be based, as examples, on a deep neural network (DNN) or a gated recurrent unit. At block 308, processor 204 rescales statistical features of the sampled data. Feature rescaling can be based on min-max normalization, z-scoring, or any other rescaling technique. At block 312, processor 204 extracts the statistical features from the data. Feature extraction can be based on principal component analysis, independent component analysis, an autoencoder, or any other feature extraction technique. At block 314, a physics-based model can be used to determine initial values for the spaces in the optimization range for process 300 in which the actual data is not covered at all. Examples of a physics-based model for projecting such values include linear, non-linear and neural network models.

In the example of FIG. 3, input variables sampled for wellbore drilling can include depth, hole depth, average hookload, average weight-on-bit (WOB), average RPM at the surface, average absolute torque, average flow out pump rate, average flow in pump rate, and instantaneous rate of penetration (ROP). At block 316 in FIG. 3, processor 204 selects and generates an autoencoder and time series extracted-feature model using the machine-learning model. This feature-extraction model can be configured initially using pre-existing data from another wellbore. System 200 can produce various types of extracted-feature models as appropriate, based on the input data. The extracted-feature model can include a principal component analysis model, and LSTM, a gated recurrent unit, or a singular value decomposition model. An additional example is discussed below with respect to FIG. 5. At block 318, processor 204 projects missing values and corrected outlier values using the extracted-feature model to provide revised data values for use in projecting controllable drilling parameters. At block 320, some or all of the revised values from block 318 can optionally be replaced by receiving corrected values. As an example, the revised data values may be presented to a drilling engineer or other experienced professional using console 141 and input of corrected values may be received through input/output interface 232. These corrected values can be used to update the machine-learning model using reinforcement learning.

At block 324, processor 204 determines whether optimum data values have been achieved for example, by checking to determine if optimization criteria have been met. Optimization criteria may include, as an example, convergence within a specified interval. If not, the machine-learning model is retrained at block 304. Otherwise, processor 204 provides the controllable drilling parameters at block 326. Current data is also updated at block 326, by reading and writing to the and MQTT message bus at block 302 to provide updated current data, and process 300 repeats for each iteration as drilling progresses. For each iteration, Bayesian optimization can be used to sample new data and the machine-learning model is retrained to reduce computational time and improve accuracy. In the example shown in FIG. 3, DNN computation time is a function of the computation time for feature rescaling, feature extraction, the physics-based model process, and the autoencoder and time series modeling. The DNN accuracy is a function of the accuracy of the feature rescaling, feature extraction, and the physics-based model, as well as the autoencoder and time series modeling.

Figure 4:
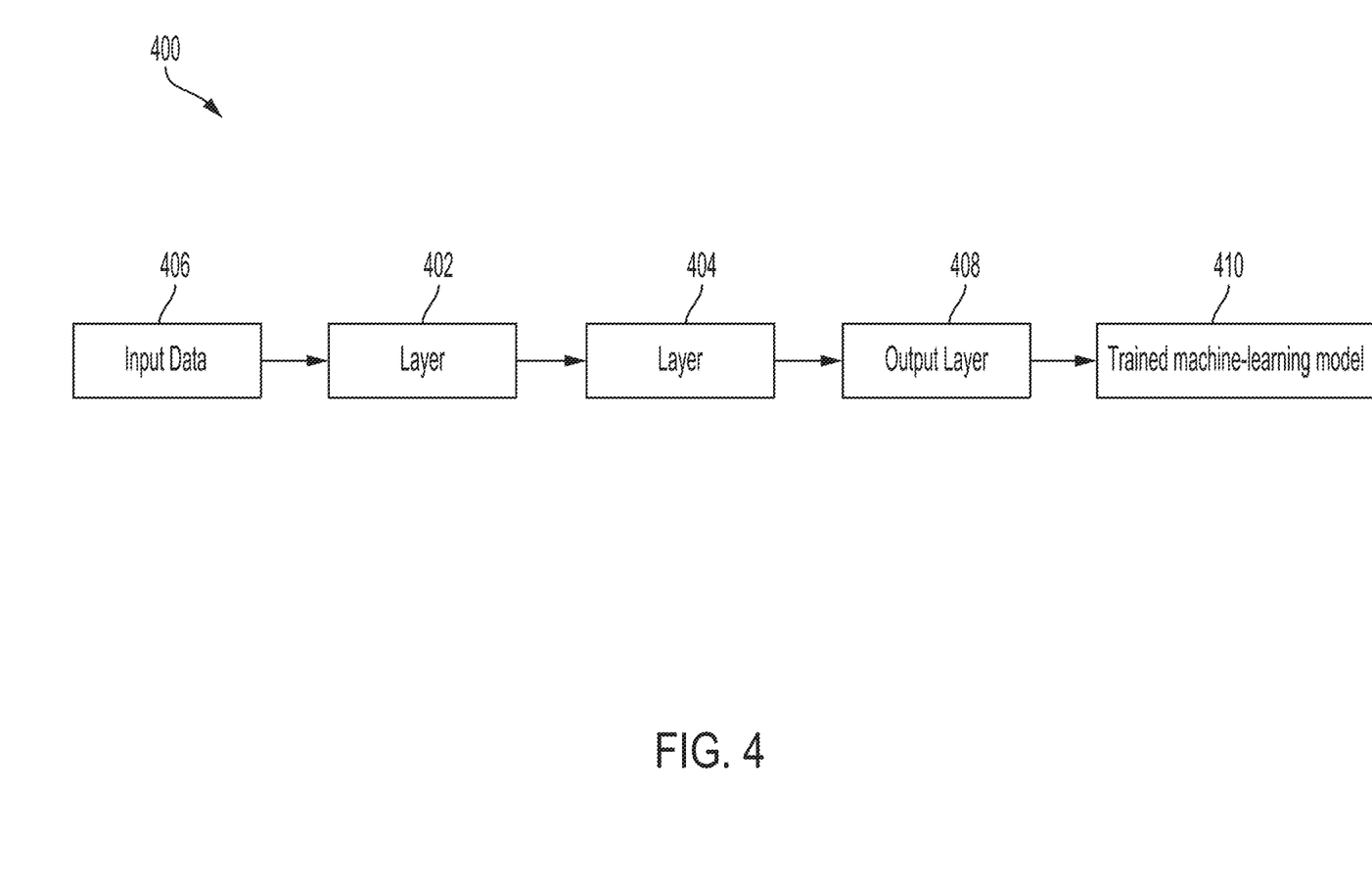
FIG. 4 is an example of a neural network architecture that can be used to provide data quality improvement according to some aspects of the disclosure.

FIG. 4 is an example of a DNN architecture 400 that can be used as the machine-learning model in FIG. 3 to provide data quality improvement according to some aspects of the disclosure. Architecture 400 includes network layer 402, and network layer 404. Input data 406 supplies layer 402. Layer 404 feeds output layer 408. Once output layer 408 receives input from the other layers, trained machine learning model 410 is ready to be used in making projections.

Figure 5:
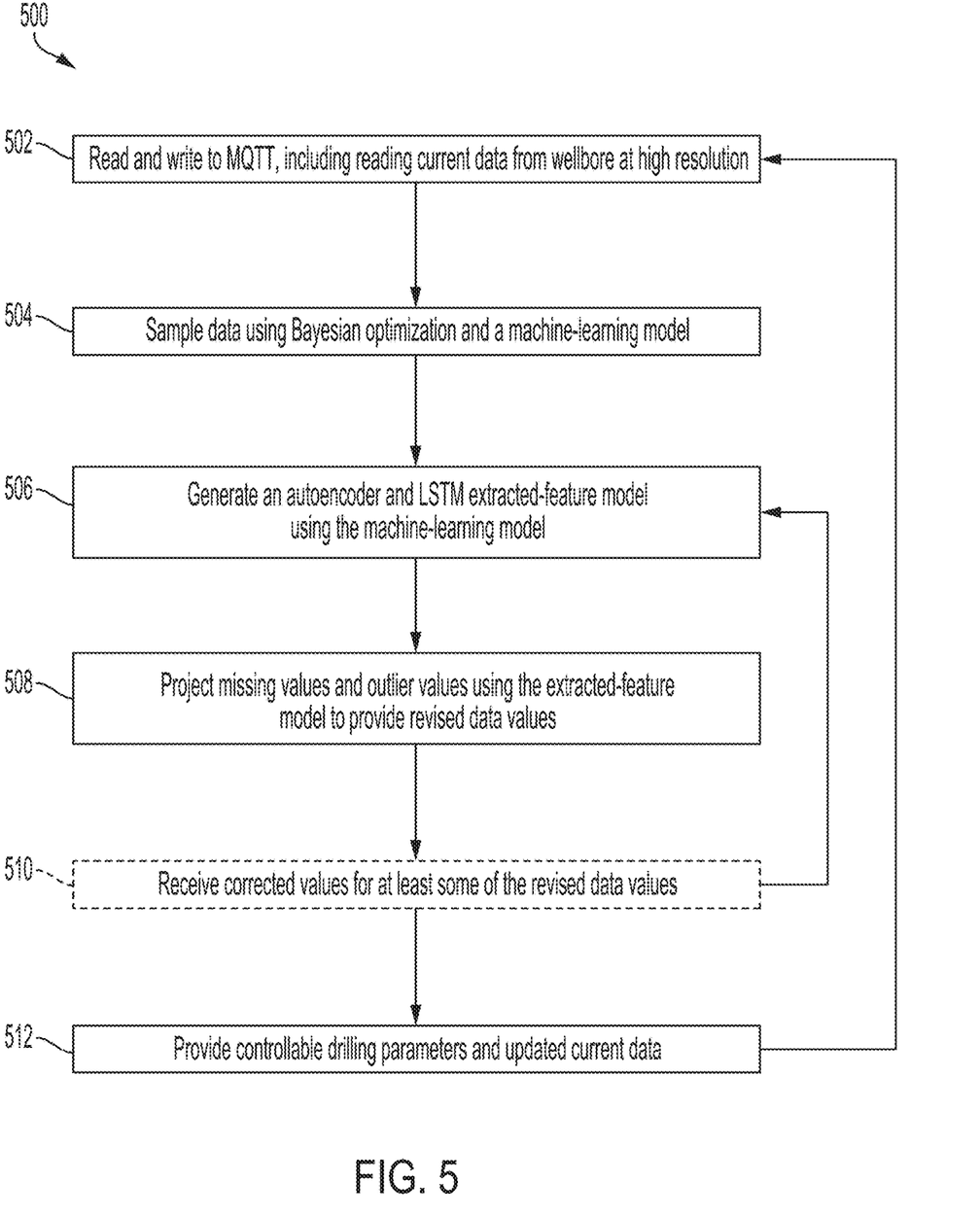
FIG. 5 is a flowchart of another example of a process of using data quality improvement to provide values for controllable parameters for a drilling tool according to some aspects of the disclosure.

FIG. 5 is a flowchart of an example of a process 500 using a long short-term memory (LSTM) neural network architecture with an autoencoder for the extracted feature model to provide data quality improvement according to some aspects of the disclosure. At block 502, processor 204 reads and writes to the MQTT message bus 145 as needed to both input and output data. At block 504, processor 204 samples the data that has been collected using Bayesian optimization and a machine-learning model to normalize the data. At block 506 in FIG. 5, processor 204 selects and generates an autoencoder and deep long short-term memory (LSTM) extracted-feature model using the machine-learning model. An LSTM neural network can isolate patterns in data. At block 508, processor 204 projects missing values and corrected outlier values using the extracted-feature model to provide revised data values for use in projecting controllable drilling parameters. At block 510, some or all of the revised values from block 508 can optionally be replaced by receiving corrected values as described with respect to FIG. 3. At block 512, processor 204 provides the controllable drilling parameters to the message bus. Current data is also updated, by reading from the MQTT message bus at block 502, and process 300 repeats for each iteration as drilling progresses.

Figure 6:
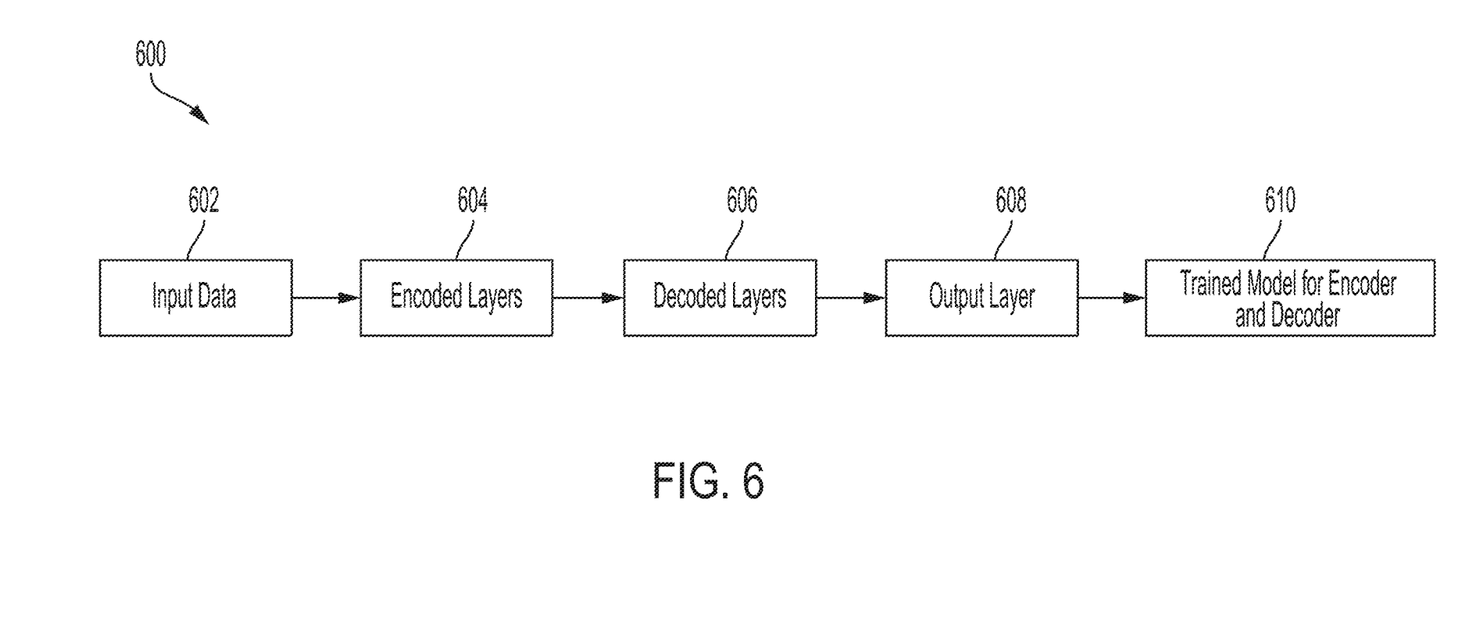
FIG. 6 is an example of a training architecture for an autoencoder that can be used to provide data quality improvement according to some aspects of the disclosure.
Figure 7:
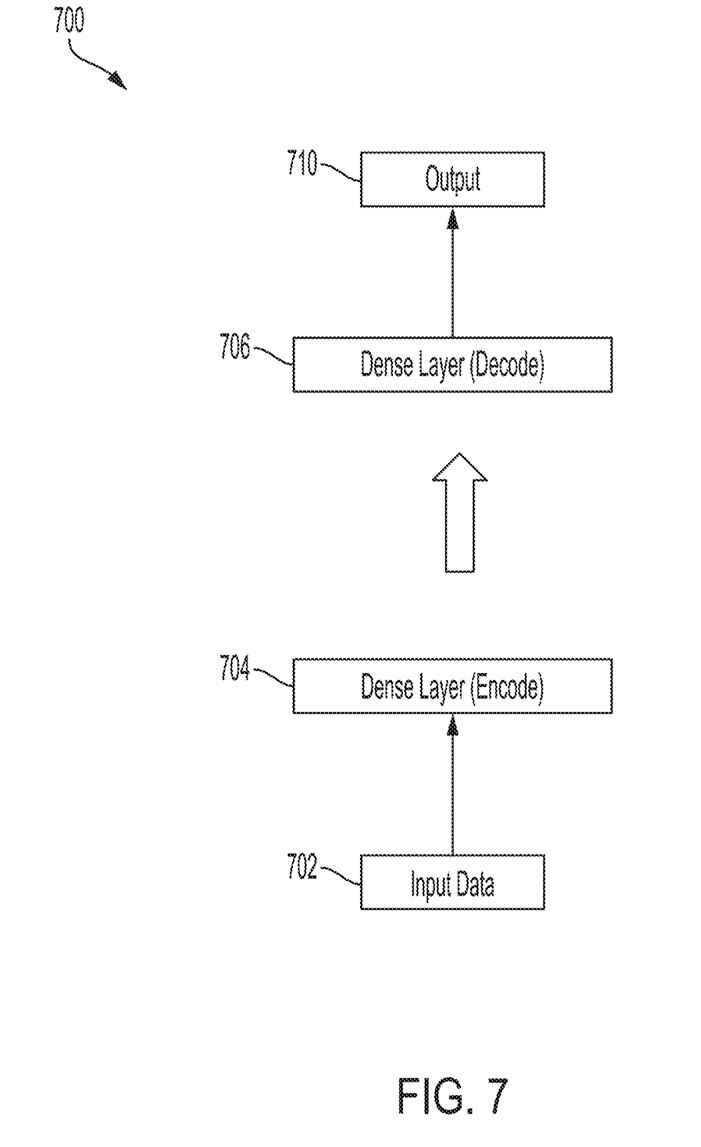
FIG. 7 is an example of a data flow for a deep autoencoder that can be used to provide data quality improvement according to some aspects of the disclosure.

FIG. 6 and FIG. 7 show examples of autoencoder architectures that can be used with the LSTM in process 500 of the example of FIG. 5. In this example, the encoding dimension is 500. A rectified linear activation function is used for the autoencoder. 128 nodes are used for the LSTM followed by a dense layer. Four historical data points from a pre-existing wellbore data can be used for initial training. An Adam optimizer with loss function based on mean-squared error can be used for ongoing training.

In the example of FIG. 6, the input data 602 for architecture 600 is collected at the edge from various sensors using Internet-of-things (IoT) streams. Initially, this data is used to develop and deploy the statistical models for the DQE 148. Input data 602 is fed to encoded layers 604, which in turn feed data to decoded layers 606 and the output layer 608, which updates the trained model 610 for the encoder and decoder.

FIG. 7 illustrates an example of a data flow 700 for a deep autoencoder that can be used with an LSTM. Data 702 is input to a dense layer 704 that provides encoding. Dense layer 706 provides decoding to provide output data 710. The DQE performs missing data imputation and outlier elimination to produces the projected data. The DQE can also generate the events.

Figure 8:
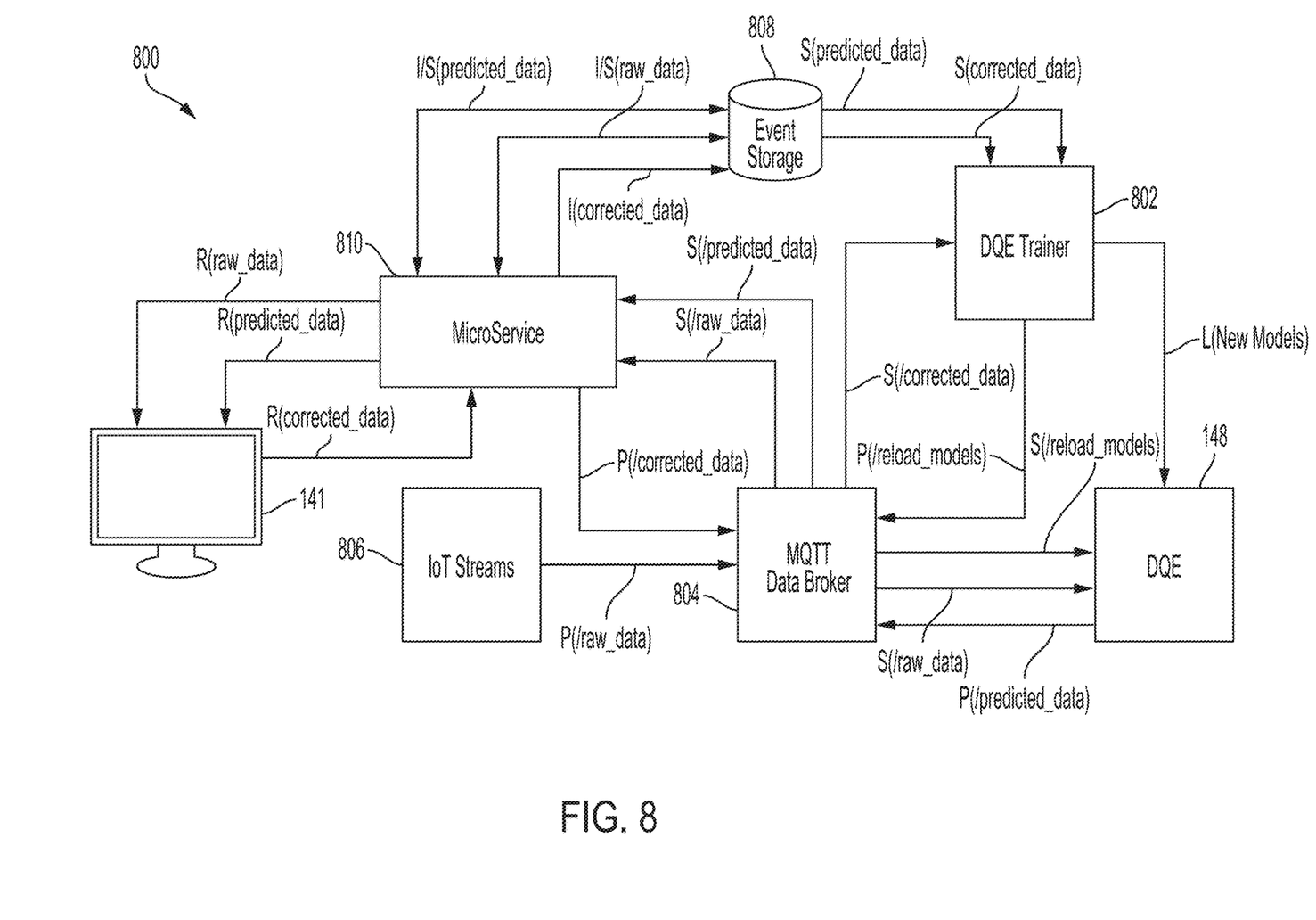
FIG. 8 is an example of a real-time data flow in a system for data quality improvement to provide accurate data for control of a drilling tool according to some aspects of the disclosure.

FIG. 8 is an example of a real-time data quality improvement data flow 800 in a system to provide accurate data for control of a drilling tool according to some aspects of the disclosure. FIG. 8 includes legends for the data flow indicators. The letter I indicates imputed data. S indicates streamed data and I/S indicates imputed, streamed data. P indicates projected data. L indicates learning data and R indicates raw data. Initially, data is used to train a DQE trainer 802 and develop and deploy the statistical models for the DQE 148. All of this activity is brokered through the MQTT data broker 804. The DQE receives the data from sensors via IoT streams 806 and uses the selected models to work on the raw data and perform missing data imputation, outlier elimination and regime shift identification and rectification. The DQE can also generate the events, which can be saved in event store 808. The raw and projected data can be viewed using console 141, which may be implemented through a Web-based graphical user interface (GUI) that connects with microservice 810 in the backend with functionality supplied via an interface such as a representational state transfer (REST) interface. The drill operator, engineer, or other expert can optionally use this interface to further correct the data. This corrected data can be sent back through the DQE trainer 802 for further improvement of the models and the improved models, including the trained autoencoder, are deployed into the DQE.

Figure 9:
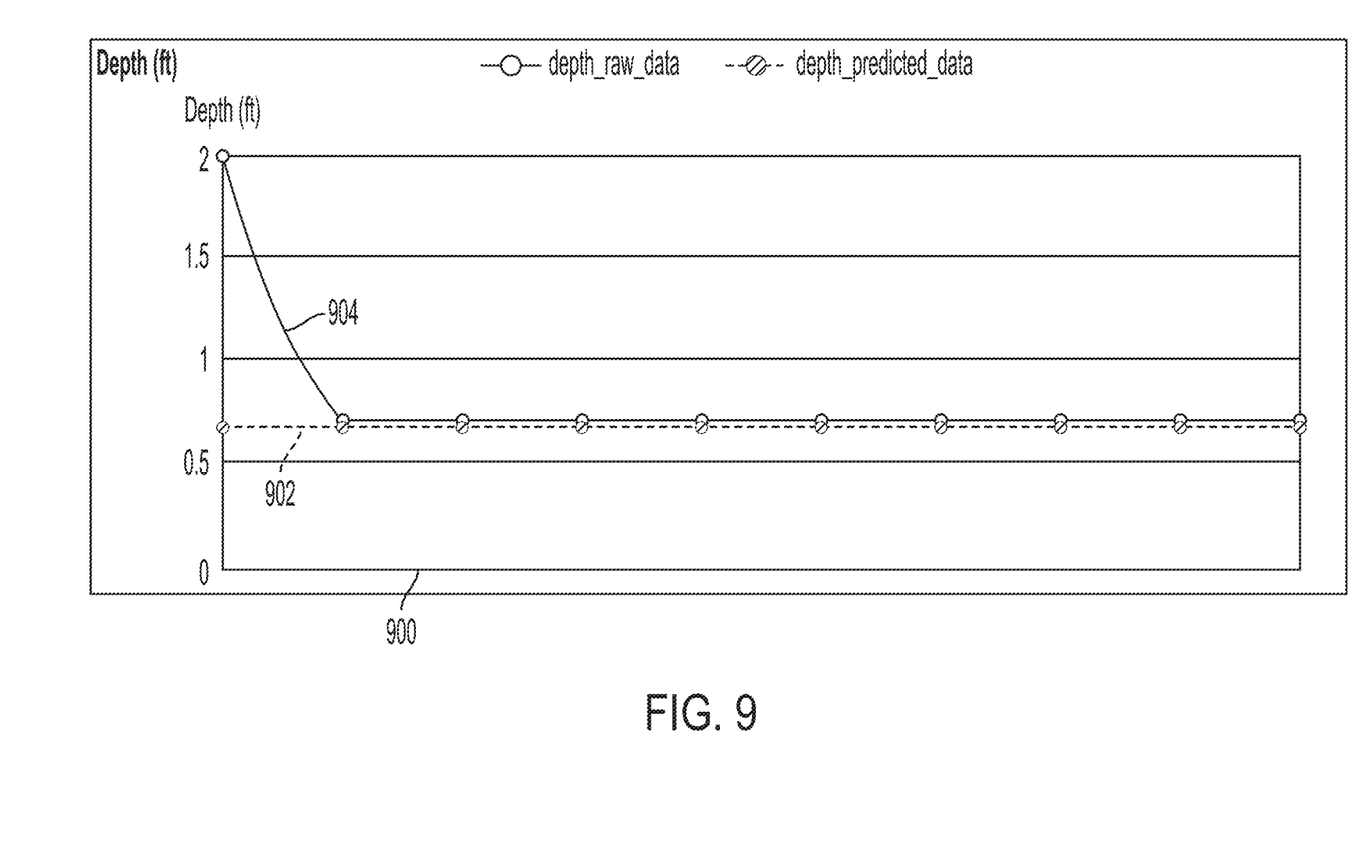
FIG. 9 is an example of a screen display showing sample results for projected drill depth vs. time using data quality improvement according to some aspects of the disclosure.
Figure 10:
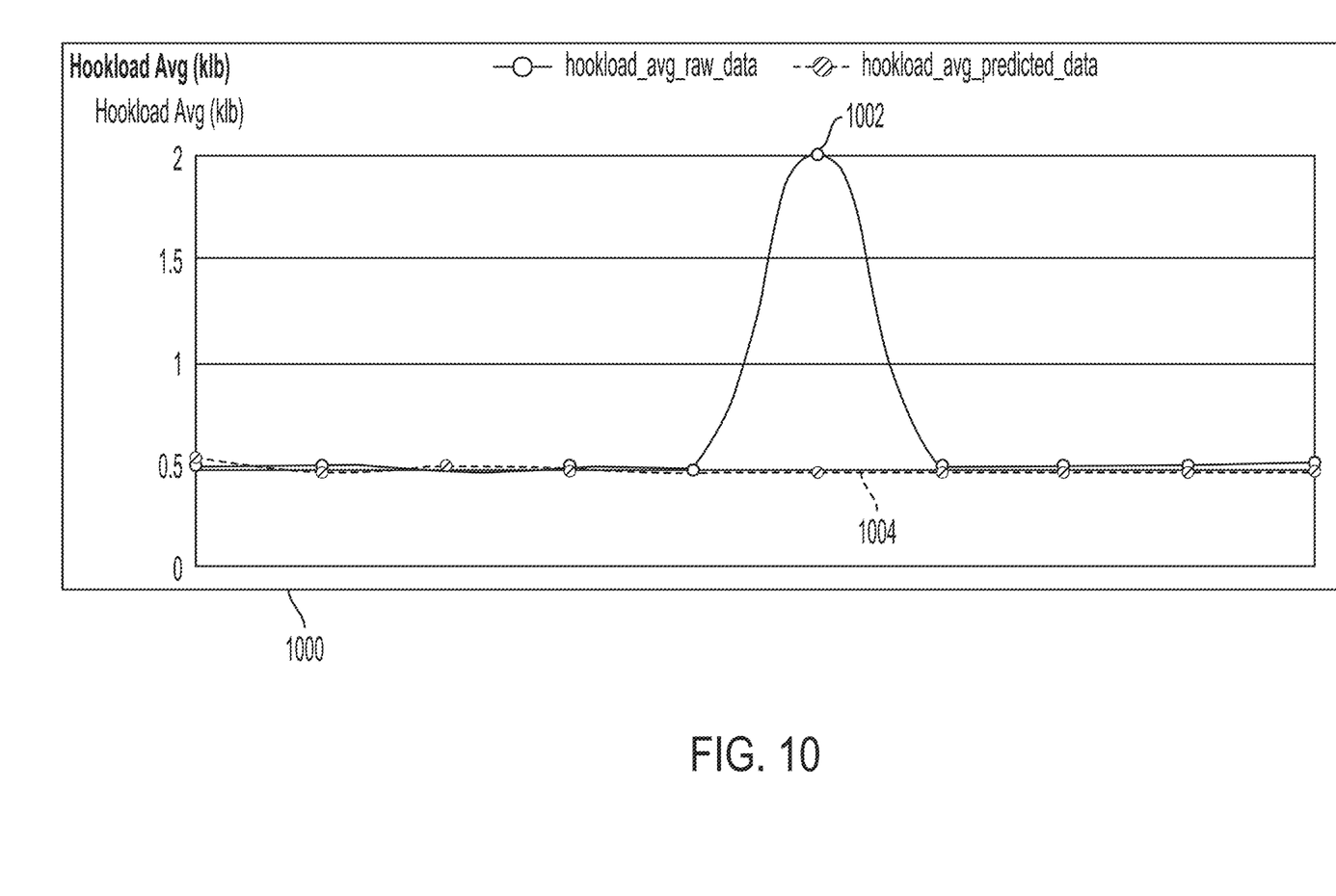
FIG. 10 is an example of a screen display showing sample results for projected hookload for drilling a wellbore using data quality improvement according to some aspects of the disclosure.
Figure 11:
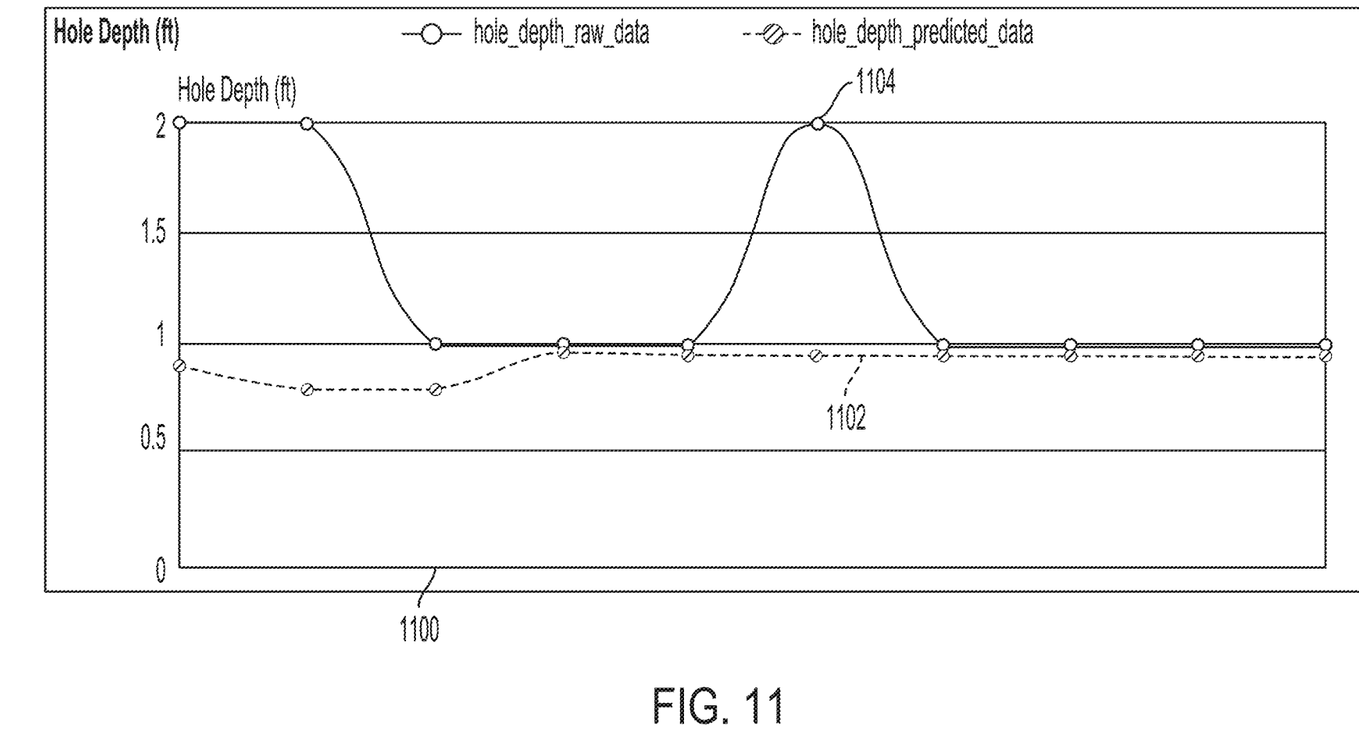
FIG. 11 is an example of a screen display showing sample results for projected hole depth vs. time for drilling a wellbore using data quality improvement according to some aspects of the disclosure.
Figure 12:
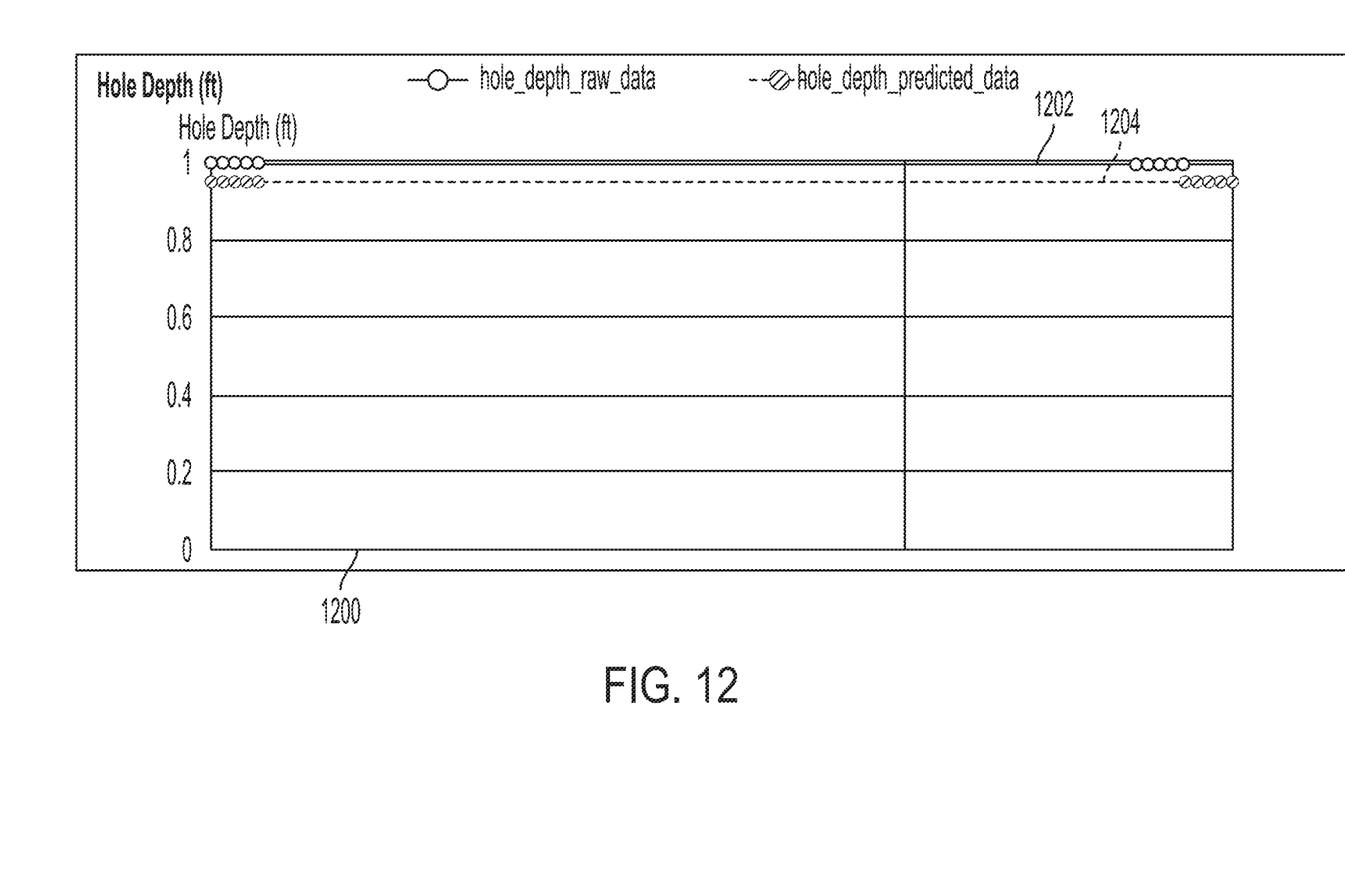
FIG. 12 is an example of a screen display showing sample results for projected hole depth vs. time for drilling a wellbore using data quality improvement according to some aspects of the disclosure.

FIGS. 9-12 show examples of screen displays in a system using the autoencoder and LSTM projection for real-time drilling data. FIG. 9 is a graph 900 showing projected data 902 and the raw data 904 for hole depth. FIG. 10 is a graph 1000 showing the LSTM projection of an outlier 1002 in the raw data and the projected data 1004 for the hookload. FIG. 11 is a graph 1100 illustrating the use of the LSTM model projection 1102 for the hole depth and the location of an outlier 1104. FIG. 12 is a graph 1200 showing the projected data 1202 for the missing hole depth data in raw data 1204.

In some aspects, a system for wellbore drilling using data quality control according to one or more of the following examples. As used below, any reference to a series of examples is to be understood as a reference to each of those examples disjunctively (e.g., "Examples 1-4" is to be understood as "Examples 1, 2, 3, or 4").

Example 1. A system includes a processor and a non-transitory memory device including instructions that are executable by the processor to cause the processor to perform operations. The operations include receiving current data from a wellbore, training a machine-learning model using Bayesian optimization sampling of the current data from the wellbore, generating an extracted-feature model based on the current data from the wellbore using the machine-learning model, projecting at least one of missing values or outlier values using the extracted-feature model to provide revised data values, and providing, using the revised values, at least one controllable drilling parameter for a drilling tool.

Example 2. The system of example 1 further includes a message queuing telemetry transport (MQTT) message bus communicatively coupled to the processor to receive the current data from the wellbore. The operations further include applying the at least one controllable drilling parameter to the drilling tool by publishing the at least one controllable drilling parameter to the MQTT message bus, generating updated current data, and publishing the updated current data to the MQTT message bus.

Example 3. The system of example(s) 1-2, wherein the machine-learning model includes at least one of a long short-term memory deep neural network or a gated recurrent unit.

Example 4. The system of example(s) 1-3, wherein the extracted-feature model includes at least one of an autoencoder and time series model, an autoencoder and a long short-term memory model, a principal component analysis model, gated recurrent unit, or a singular value decomposition model.

Example 5. The system of example(s) 1-4, wherein the operations further include comparing the at least one controllable drilling parameter to at least one optimization criteria and retraining the machine-learning model in response to the comparing.

Example 6. The system of example(s) 1-5, wherein the operations further include initially configuring the extracted-feature model using pre-existing wellbore data.

Example 7. The system of example(s) 1-6, wherein the operations further include receiving corrected values for at least some of the revised data values.

Example 8. A method includes receiving, by a processor, current data from a wellbore, training, by the processor, a machine-learning model using Bayesian optimization sampling of the current data from the wellbore, generating, by the processor, an extracted-feature model based on the current data from the wellbore using the machine-learning model, projecting, by the processor, at least one of missing values or outlier values using the extracted-feature model to provide revised data values, and providing, using the processor and the revised values, at least one controllable drilling parameter for a drilling tool.

Example 9. The method of example 8 further includes applying the at least one controllable drilling parameter to the drilling tool by publishing the at least one controllable drilling parameter to a message queuing telemetry transport (MQTT) message bus, generating updated current data, and publishing the updated current data to the MQTT message bus.

Example 10. The method of example(s) 8-9, wherein the machine-learning model includes at least one of a long short-term memory deep neural network or a gated recurrent unit.

Example 11. The method of example(s) 8-10, wherein the extracted-feature model includes at least one of an autoencoder and time series model, an autoencoder and a long short-term memory model, a principal component analysis model, gated recurrent unit, or a singular value decomposition model.

Example 12. The method of example(s) 8-11 further includes comparing the at least one controllable drilling parameter to at least one optimization criteria and retraining the machine-learning model in response to the comparing.

Example 13. The method of example(s) 8-12 further includes initially configuring the extracted-feature model using pre-existing wellbore data.

Example 14. The method of example(s) 8-13 further includes receiving corrected values for at least some of the revised data values.

Example 15. A non-transitory computer-readable medium includes instructions that are executable by a processor for causing the processor to perform operations to produce controllable drilling parameters. The operations include receiving current data from a wellbore, training a machine-learning model using Bayesian optimization sampling of the current data from the wellbore, generating an extracted-feature model based on the current data from the wellbore using the machine-learning model, projecting at least one of missing values or outlier values using the extracted-feature model to provide revised data values, and providing, using the revised values, at least one controllable drilling parameter for a drilling tool.

Example 16. The non-transitory computer-readable medium of example 15, wherein the operations further include applying the at least one controllable drilling parameter to the drilling tool by publishing the at least one controllable drilling parameter to a message queuing telemetry transport (MQTT) message bus, generating updated current data, and publishing the updated current data to the MQTT message bus.

Example 17. The non-transitory computer-readable medium of example 15-16, wherein the machine-learning model includes at least one of a long short-term memory deep neural network or a gated recurrent unit, and the extracted-feature model comprises at least one of an autoencoder and time series model, an autoencoder and a long short-term memory model, a principal component analysis model, gated recurrent unit, or a singular value decomposition model.

Example 18. The non-transitory computer-readable medium of example(s) 15-17, wherein the operations further include comparing the at least one controllable drilling parameter to at least one optimization criteria, and retraining the machine-learning model in response to the comparing.

Example 19. The non-transitory computer-readable medium of example(s) 15-18, wherein the operations further include initially configuring the extracted-feature model using pre-existing wellbore data.

Example 20. The non-transitory computer-readable medium of example(s) 15-19, wherein the operations further include receiving corrected values for at least some of the revised data values.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A system comprising:
a processor; and
a non-transitory memory device comprising instructions that are executable by the processor to cause the processor to perform operations comprising:
receiving current data from a wellbore;
training a machine-learning model using Bayesian optimization sampling of the current data from the wellbore;
generating an extracted-feature model based on the current data from the wellbore using the machine-learning model;
projecting missing values and outlier values using the extracted-feature model to provide revised data values; and
controlling a drilling tool using at least one controllable drilling parameter.

2. The system of claim 1, further comprising a message queuing telemetry transport (MQTT) message bus communicatively coupled to the processor to receive the current data from the wellbore, and wherein the operations further comprise:
applying the at least one controllable drilling parameter to the drilling tool by publishing the at least one controllable drilling parameter to the MQTT message bus;
generating updated current data; and
publishing the updated current data to the MQTT message bus.

3. The system of claim 1, wherein the machine-learning model comprises at least one of a long short-term memory deep neural network or a gated recurrent unit.

4. The system of claim 1, wherein the extracted-feature model comprises at least one of an autoencoder and time series model, an autoencoder and a long short-term memory model, a principal component analysis model, gated recurrent unit, or a singular value decomposition model.

5. The system of claim 1, wherein the operations further comprise:
comparing the at least one controllable drilling parameter to at least one optimization criteria; and
retraining the machine-learning model in response to the comparing.

6. The system of claim 1, wherein the operations further comprise initially configuring the extracted-feature model using pre-existing wellbore data.

7. The system of claim 1, wherein the operations further comprise receiving corrected values for at least some of the revised data values.

8. A method comprising:
receiving, by a processor, current data from a wellbore;
training, by the processor, a machine-learning model using Bayesian optimization sampling of the current data from the wellbore;
generating, by the processor, an extracted-feature model based on the current data from the wellbore using the machine-learning model;
projecting, by the processor, missing values and outlier values using the extracted-feature model to provide revised data values; and
controlling a drilling tool using at least one controllable drilling parameter.

9. The method of claim 8, further comprising:
applying the at least one controllable drilling parameter to the drilling tool by publishing the at least one controllable drilling parameter to a message queuing telemetry transport (MQTT) message bus;
generating updated current data; and
publishing the updated current data to the MQTT message bus.

10. The method of claim 8, wherein the machine-learning model comprises at least one of a long short-term memory deep neural network or a gated recurrent unit.

11. The method of claim 8, wherein the extracted-feature model comprises at least one of an autoencoder and time series model, an autoencoder and a long short-term memory model, a principal component analysis model, gated recurrent unit, or a singular value decomposition model.

12. The method of claim 8, further comprising:
comparing the at least one controllable drilling parameter to at least one optimization criteria; and
retraining the machine-learning model in response to the comparing.

13. The method of claim 8, further comprising initially configuring the extracted-feature model using pre-existing wellbore data.

14. The method of claim 8, further comprising receiving corrected values for at least some of the revised data values.

15. A non-transitory computer-readable medium that includes instructions that are executable by a processor for causing the processor to perform operations to produce controllable drilling parameters, the operations comprising:
receiving current data from a wellbore;
training a machine-learning model using Bayesian optimization sampling of the current data from the wellbore;
generating an extracted-feature model based on the current data from the wellbore using the machine-learning model;
projecting missing values and outlier values using the extracted-feature model to provide revised data values; and
controlling a drilling tool using at least one controllable drilling parameter.

16. The non-transitory computer-readable medium of claim 15, wherein the operations further comprise:
applying the at least one controllable drilling parameter to the drilling tool by publishing the at least one controllable drilling parameter to a message queuing telemetry transport (MQTT) message bus;
generating updated current data; and
publishing the updated current data to the MQTT message bus.

17. The non-transitory computer-readable medium of claim 15, wherein:
the machine-learning model comprises at least one of a long short-term memory deep neural network or a gated recurrent unit; and
the extracted-feature model comprises at least one of an autoencoder and time series model, an autoencoder and a long short-term memory model, a principal component analysis model, gated recurrent unit, or a singular value decomposition model.

18. The non-transitory computer-readable medium of claim 15, wherein the operations further comprise:
comparing the at least one controllable drilling parameter to at least one optimization criteria; and
retraining the machine-learning model in response to the comparing.

19. The non-transitory computer-readable medium of claim 15, wherein the operations further comprise initially configuring the extracted-feature model using pre-existing wellbore data.

20. The non-transitory computer-readable medium of claim 15, wherein the operations further comprise receiving corrected values for at least some of the revised data values.

\* \* \* \* \*